United States Patent
Funahashi et al.

(10) Patent No.: US 6,631,306 B2
(45) Date of Patent: Oct. 7, 2003

(54) EMBROIDERY PRODUCTION SYSTEM WITH SINGLE-HEAD EMBROIDERY SEWING MACHINES AND METHOD THEREFOR

(75) Inventors: Kazunori Funahashi, Nagoya (JP); Shoichi Kubo, Hekinan (JP); Hiroaki Hanai, Chita-gun (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 144 days.

(21) Appl. No.: 09/865,438

(22) Filed: May 29, 2001

(65) Prior Publication Data

US 2002/0013745 A1 Jan. 31, 2002

(30) Foreign Application Priority Data

May 29, 2000 (JP) ........................ 2000-158458

(51) Int. Cl.$^7$ ..................... G06F 17/60; G06F 19/00
(52) U.S. Cl. ..................... 700/138; 700/99; 705/8
(58) Field of Search .................. 700/138, 136, 700/137, 99, 100; 705/8, 1, 7; 112/475.19, 102.5, 470.06

(56) References Cited

U.S. PATENT DOCUMENTS

| | | | |
|---|---|---|---|
| 4,369,722 A | | 1/1983 | Nishida et al. |
| 4,932,342 A | | 6/1990 | Hisatake et al. |
| 5,881,657 A | | 3/1999 | Asano |
| 5,921,194 A | | 7/1999 | Komuro et al. |
| 5,974,992 A | * | 11/1999 | Asano ............... 112/102.5 |
| 6,105,520 A | * | 8/2000 | Frazer et al. .......... 112/155 X |

* cited by examiner

Primary Examiner—Peter Nerbun
(74) Attorney, Agent, or Firm—Oblon, Spivak, McClelland, Maier & Neustadt, P.C.

(57) ABSTRACT

An embroidery production system having a plurality of single-head embroidery sewing machines determines the number and the layout of the single-head embroidery sewing machines based on production items, production volume per item and the size of the factory floor of the embroidery supplier, and makes a production plan operating each single-head embroidery sewing machine based an the item, production volume and a due date of an article which should be completed for embroidering by a predetermined period.

15 Claims, 9 Drawing Sheets

FIG. 3

PRODUCTION ACHIEVEMENT FOR THE PREVIOUS YEAR

| ITEM | CLASSIFIED | THE VOLUME OF PRODUCTION | EMBROIDERING TIME T1 | SET UP CHANGING TIME T2 |
|---|---|---|---|---|
| BASEBALL CAP | A | 200 | 3 | 5 |
| T-SHIRT | B | 400 | 3 | 1.5 |
| TOWEL | B | 300 | 3 | 1.5 |
| HANDKERCHIEF | C | 1000 | 3 | 1.5 |
| T-SHIRT | A | 600 | 2 | 1 |
| JUMPER | C | 200 | 8 | 3 |
| ... | ... | ... | ... | ... |

FIG. 4

EMBROIDERING REQUIRED TIME PER ITEM

| ITEM | CLASSIFIED | EMBROIDERING TIME T1 | SET UP CHANGING TIME T2 |
|---|---|---|---|
| BASEBALL CAP | A | 3 | 5 |
|  | B | 5 | 6 |
|  | C | 7 | 7 |
| T-SHIRT | A | 2 | 1 |
|  | B | 3 | 1.5 |
|  | C | 5 | 2 |
| HANDKERCHIEF | A | 1 | 1 |
|  | B | 2 | 1 |
|  | C | 3 | 1.5 |
| TOWEL | A | 1 | 1 |
|  | B | 3 | 1.5 |
|  | C | 4 | 1.5 |
| JUMPER | A | 4 | 1.5 |
|  | B | 6 | 2 |
|  | C | 8 | 3 |
| CUSHION | A | 3 | 1 |
|  | B | 4 | 1.5 |
|  | C | 5 | 2 |
| CARDIGAN | A | 5 | 1 |
|  | B | 6 | 1 |
|  | C | 7 | 2 |
| ... | ... | ... | ... |

ORDER LIST

| ORDER NO. | ITEM | VOLUME | THE VOLUME OF STITCH | THE VOLUME OF COLOR | CLASSIFIED | CUSTOMER | DUE DATE DATE | DUE DATE TIME | COMPLETION DEADLINE DATE | COMPLETION DEADLINE TIME |
|---|---|---|---|---|---|---|---|---|---|---|
| 1 | BASEBALL CAP | 40 | 3000 | 5 | A | CUSTOMER A | 00.06.01 | | 00.06.01 | 10:00 |
| 2 | T-SHIRT | 30 | 3500 | 6 | A | CUSTOMER A | 00.06.01 | 12:00 | 00.06.01 | 10:00 |
| 3 | TOWEL | 40 | 4000 | 4 | A | CUSTOMER A | 00.06.01 | 12:00 | 00.06.01 | 10:00 |
| 4 | HANDKERCHIEF | 100 | 3000 | 5 | A | CUSTOMER B | 00.06.02 | 12:00 | 00.06.01 | 17:00 |
| 5 | BLOUSE | 50 | 5000 | 8 | B | CUSTOMER C | 00.06.02 | 12:00 | 00.06.01 | 17:00 |
| 6 | JUMPER | 20 | 5000 | 7 | B | CUSTOMER D | 00.06.02 | 12:00 | 00.06.01 | 17:00 |
| 7 | T-SHIRT | 50 | 5500 | 7 | B | CUSTOMER D | 00.06.02 | 12:00 | 00.06.01 | 17:00 |
| 8 | CLOTH | 100 | 6000 | 10 | C | CUSTOMER B | 00.06.02 | 17:00 | 00.06.02 | 12:00 |
| ... | ... | ... | ... | ... | ... | ... | ... | ... | ... | ... |

FIG. 6

FIG. 7
PRODUCTION PLAN BY THE IDENTICAL ITEM PRODUCTION PATTERN     UNIT : MINUTE
| | | | | | | |
|---|---|---|---|---|---|---|
| SET UP CHANGING TIME | | 5 | | 1 | | 1 |
| EMBROIDERING TIME |  | 3 |  | 2 |  | 2 |
| FRAME CHANGING TIME | | 0.5 | | 0.5 | | 0.5 |
| ... | ... | | ... | | ... | |
| FRAME CHANGING TIME | | 0.5 | | 1 | | 0.5 |
| EMBROIDERING TIME | 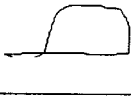 | 3 |  | 2 |  | 1 |
| SET UP CHANGING TIME | | | | 1 | | |
| FRAME CHANGING TIME | | 0.5 | | | | 0.5 |
| ... | ... | | ... | | ... | |
| EMBROIDERING TIME | 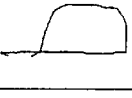 | 3 | | |  | 1 |
| | | 5 | | | | 1 |
| TOTAL TME (MINUTE) | | 149.5 | | 76.5 | | 61.5 |

FIG. 8

PRODUCTION PLAN BY THE MIXED ITEM PRODUCTION PATTERN   UNIT: MINUTE

| | | | | | | |
|---|---|---|---|---|---|---|
| SET UP CHANGING TIME | | 5 | | 5 | | 5 |
| EMBROIDERING TIME | 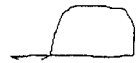 | 3 |  | 3 |  | 3 |
| FRAME CHANGING TIME | | 0.5 | | 0.5 | | 0.5 |
| | ... | | ... | | ... | |
| SET UP CHANGING TIME | | | | 5+1 | | 5+ |
| FRAME CHANGING TIME | | 0.5 | | | | |
| EMBROIDERING TIME | 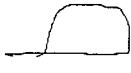 | 3 |  | 2 |  | 2 |
| SET UP CHANGING TIME | | 5+1 | | | | |
| FRAME CHANGING TIME | | | | 0.5 | | 0.5 |
| EMBROIDERING TIME |  | 2 | 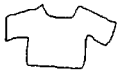 | 2 |  | 2 |
| FRAME CHANGING TIME | | 0.5 | | 0.5 | | 0.5 |
| | ... | | ... | | ... | |
| SET UP CHANGING TIME | | | | 1+1 | | 1+ |
| FRAME CHANGING TIME | | 0.5 | | | | |
| EMBROIDERING TIME |  | 2 |  | 1 |  | 1 |
| SET UP CHANGING TIME | | 1+1 | | | | |
| FRAME CHANGING TIME | | | | 0.5 | | 0.5 |
| EMBROIDERING TIME |  | 1 |  | 1 |  | 1 |
| FRAME CHANGING TIME | | 0.5 | | 0.5 | | 0.5 |
| | ... | | ... | | ... | |
| SET UP CHANGING TIME | | 1 | | | | |
| FRAME CHANGING TIME | | | | 0.5 | | 0.5 |
| EMBROIDERING TIME |  | |  | 1 | | 1 |
| SET UP CHANGING TIME | | | | 1 | | 1 |
| TOTAL TIME | | 101.5 | | 104 | | 104 |

EMBROIDERY PRODUCTION SYSTEM WITH SINGLE-HEAD EMBROIDERY SEWING MACHINES AND METHOD THEREFOR

CROSS REFERENCE TO RELATED APPLICATIONS

The present application is based on Japanese Application 2000-158458, filed on May 29, 2000, which is hereby incorporated by reference in its entirety.

BACKGROUND OF THE INVENTION

1. Field of the Invention

This invention relates to an embroidery production system for embroidering articles using single-head embroidery sewing machines.

2. Discussion of the Background

One known conventional embroidery sewing machine used in a factory of an embroidery supplier is a multi-head embroidery sewing machine having a plurality of embroidery heads. The plurality of embroidery heads of the multi-head embroidery sewing machine driven by one motor all perform the identical embroidering. It is adequate for the minimum needs of mass production. However, recently the embroidery industry must meet the needs of individual consumers since a diversification of the needs of consumers has been increasing. A production system which can meet such needs has not been realized. The conventional multi-head embroidery sewing machine is not able to produce a small amount of set products composed of a plurality of items, and its productivity becomes extremely low.

In order to meet the needs of consumers individually, a single-head embroidery sewing machine having one embroidery head is used in a factory by the embroidery supplier. If the number, the layout and a production plan of the single-head embroidery sewing machines are not properly determined based on production items, production volume per item, a size of the factory floor of the embroidery supplier and a due date, the flow of the production is not smooth and the operating ratio is decreased. As a consequence, a high cost of production and a delay for a delivery might occur.

SUMMARY OF THE INVENTION

According to one aspect of the present invention, an embroidery production system of a plurality of single-head embroidery sewing machines includes the steps of determining the number and the layout of single-head embroidery sewing machines based on the production item, production volume per item, a size of a factory floor of an embroidery supplier, and making a production plan for operating each single-head embroidery sewing machine by a production planning device based on the item, the production volume and a due date for completion of the production of the items.

According to another aspect of the present invention, the embroidery production system of a plurality of single-head embroidery sewing machines includes the steps of determining the number and the layout of the single-head embroidery sewing machine based on the production item, production volume per item, a size of a factory floor of an embroidery supplier, determining which is more profitable between a pattern of inserting identical items and a pattern inserting different items into the plurality of single-head embroidery sewing machines respectively based on the item, production volume and a due date of an article which should be completed for embroidering by a predetermined period, and making a production plan for operating each single-head embroidery sewing machine with the more profitable pattern.

According to a further aspect of the present invention, the embroidery production system of a plurality of single-head embroidery sewing machines includes the steps of determining the number and the layout of the single-head embroidery sewing machines based on production item, production volume per item, a size of a factory floor of an embroidery supplier, making a production plan for operating each single-head embroidery sewing machine based an item, production volume and a due date of an article which should be completed for embroidering by a predetermined period, calculating an expected efficiency of operating each single-head embroidery sewing machine according to the production plan and installing a number and a layout determining device and a production planning device in a computer of the embroidery supplier in exchange for a part of the expected efficiency.

According to a further aspect of the present invention, the embroidery production system of a plurality of single-head embroidery sewing machines includes the steps of determining the number and the layout of the single-head embroidery sewing machines based on the production item, production volume per item, a size of a factory floor of an embroidery supplier, determining the more profitable production pattern between a pattern of operating each single-head embroidery sewing machine by repeatedly embroidering an single type of item and a pattern of operating each single-head embroidery sewing machine by embroidering different types of items, said step of determining the more profitable production pattern taking into account a necessary production volume for said single type of item and a due date for completion of said necessary production volume, making a production plan for operating each single-head embroidery sewing machine with the more profitable pattern selected by a production planning device, calculating the expected efficiency of operating each single-head embroidery sewing machine according to the production plan and installing a number and layout determining device and a production planning device in the computer of the embroidery supplier in exchange for a part of the expected efficiency.

According to the system of the present invention of the embroidery production system with single-head embroidery sewing machines, the number and the layout of the single-head embroidery sewing machines and the production plan operating each single-head embroidery sewing machine can be determined properly based on the production item, the production volume per item, the size of the factory floor of the embroidery supplier, the items, the production volume and a due date of an article which should be completed for embroidering. Since the articles flow smoothly and the operating ratio becomes high, high productivity of the variant production is possible. As a consequence, the embroidery supplier can meet the needs of consumers individually.

According to the system of the present invention of the embroidery production system with single-head embroidery sewing machines, the number and the layout of the single-head embroidery sewing machines are determined based on the production item, production volume per item, the size of the factory floor of the embroidery supplier. It is judged which is more profitable between a pattern inserting the article of the identical item and a pattern inserting the article of the different item to the plurality of single-head embroidery sewing machines respectively based on item, production volume and a due date of an article which should be completed for embroidering. The production plan operating each single-head embroidery sewing machine with the more profitable pattern can be used. Since the articles flow smoothly and the productivity becomes high, production of low cost is carried out. As a consequence, the embroidery supplier can meet the needs of consumers individually.

According to the system of the present invention of the embroidery production system with single-head embroidery sewing machines, the number and the layout of the single-head embroidery sewing machines, and the production plan operating each single-head embroidery sewing machine can be determined properly based on the production item, production volume per item, the size of the factory floor of the embroidery supplier, production volume and a due date of an article which should be completed for embroidering. A number and a layout determining device and a production planning device are installed in the computer of the embroidery supplier in exchange for a part of the expected improved efficiency by operating each single-head embroidery sewing machine according to the production plan. The embroidery supplier and the provider of the embroidery production system both can enjoy the profit equitably by the embroidery production system, and their cooperation becomes more intimate.

According to the system of the present invention of the embroidery production system with single-head embroidery sewing machines, the number and the layout of the single-head embroidery sewing machines can be determined based on the production item, production volume per item and the size of the factory floor of the embroidery supplier. It is judged which is more profitable between a pattern of inserting the same type of item and a pattern inserting different items to the plurality of single-head embroidery sewing machines respectively, based on item, production volume and a due date of an article which should be completed for embroidering. The production plan operating each single-head embroidery sewing machine with the more profitable pattern can be used. A number and layout determining device and a production planning device are installed in a computer of the embroidery supplier in exchange for a part of the expected improved efficiency by operating each single-head embroidery sewing machine according to the production plan. The embroidery supplier and the provider of the embroidery production system can enjoy the profit equitably, their cooperation becomes more intimate.

BRIEF DESCRIPTION OF THE DRAWINGS

A more complete appreciation of the invention and other advantages thereof will be readily obtained as the same becomes better understood by reference to the following detailed description when considered in connection with the accompanying drawings, wherein:

FIG. 3 shows a list showing a production achievement for the previous year;

FIG. 4 shows a list showing an embroidery required time per item;

FIG. 6 shows an order list;

FIG. 7 shows a list showing a required time when the production plan is made by the identical item production pattern;

FIG. 8 shows a list showing a required time when the production plan is made by the mixed production pattern.

DESCRIPTION OF THE PREFERRED EMBODIMENTS

Figure 1:
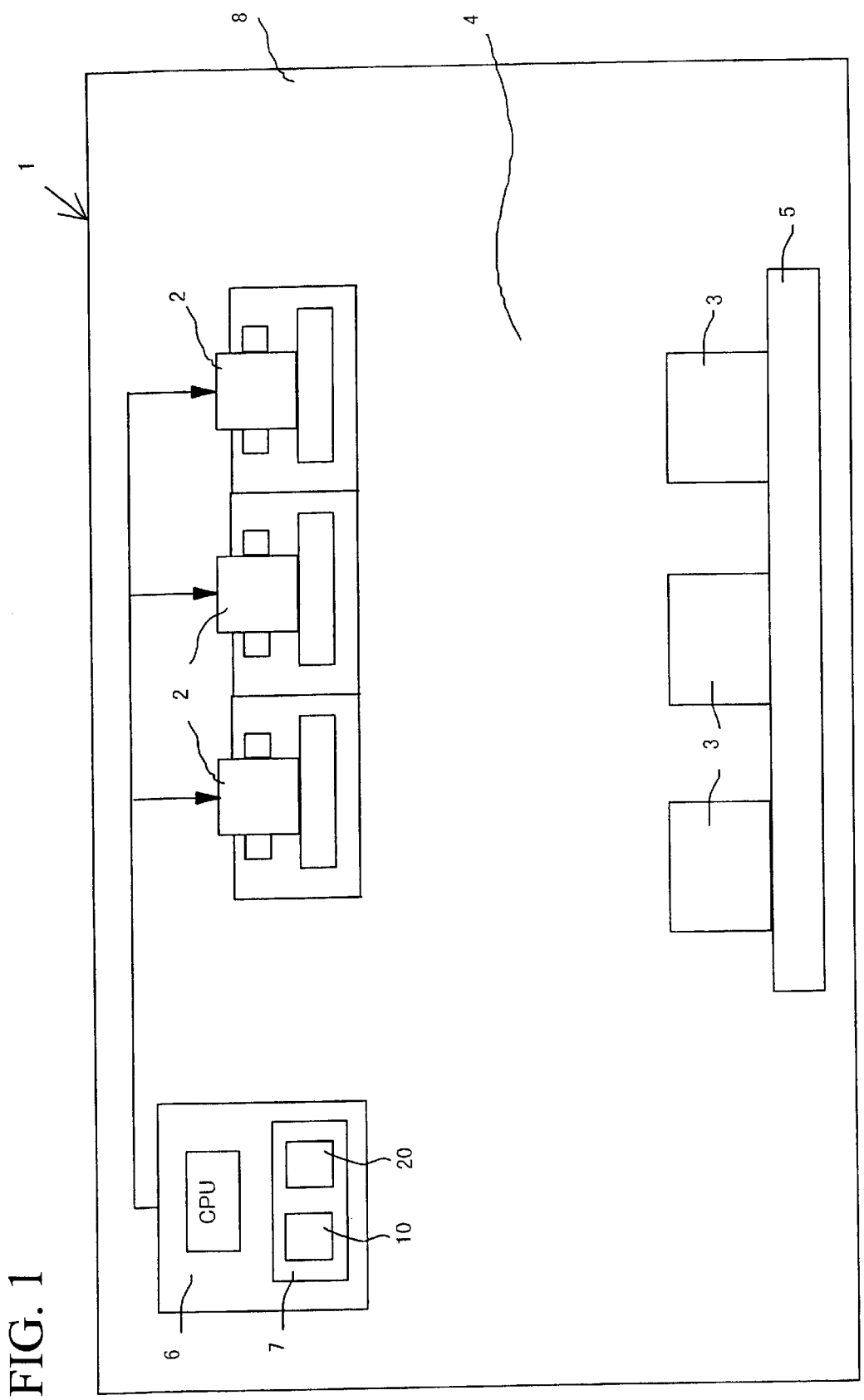
FIG. 1 shows a diagram of an embroidery production system with single-head embroidery sewing machines of the present invention.

Referring now to the embodiments of the present invention with reference to the attached drawings, FIG. 1 shows an embroidery production system with single-head embroidery sewing machines 1 providing three single-head embroidery sewing machines 2 having one embroidery head respectively, in line. Worktables 3 where articles to be embroidered are fed or removed to or from embroidery frames are arranged opposite to the three single-head embroidery sewing machines 2, with a working passage 4 therebetween. A cabinet 5 is arranged behind the worktables 3. Articles to be embroidered, various embroidery frames, side materials such as threads, maintenance tools and others are stored in the cabinet 5. A computer 6 is connected with the three single-head embroidery sewing machines 2. The embroidery data according to the articles to be embroidered is to be transferred to each single-head embroidery sewing machine 2. The number and the layout determining program 10 for determining the number and the layout of the single-head embroidery sewing machines 2 of the embroidery production system with single-head embroidery sewing machines 1 based on a production item of an embroidery supplier, a production volume per item and a size of the factory floor is memorized in a memory 7 of the computer 6. The number and the layout of the single-head embroidery sewing machines 2 of the embroidery production system with single-head embroidery sewing machines 1 is also determined by the program 10 based on the production item, the production volume per item and the size of the factory floor. The three single-head embroidery sewing machines 2, the worktables 3, the working passage 4, the cabinet 5 and the computer 6 are arranged in a rectangular factory floor 8 suitably for increasing productivity by removing unnecessary movements of the workers and things necessary for embroidering the volume of the production items ordered from customers. Further, a production planning program 20 making a production plan to operate the single-head embroidery sewing machines 2 based on the item, the volume, the due date of the articles to be embroidered by the predetermined period is installed in the memory 7 of the computer 6.

Figure 2:
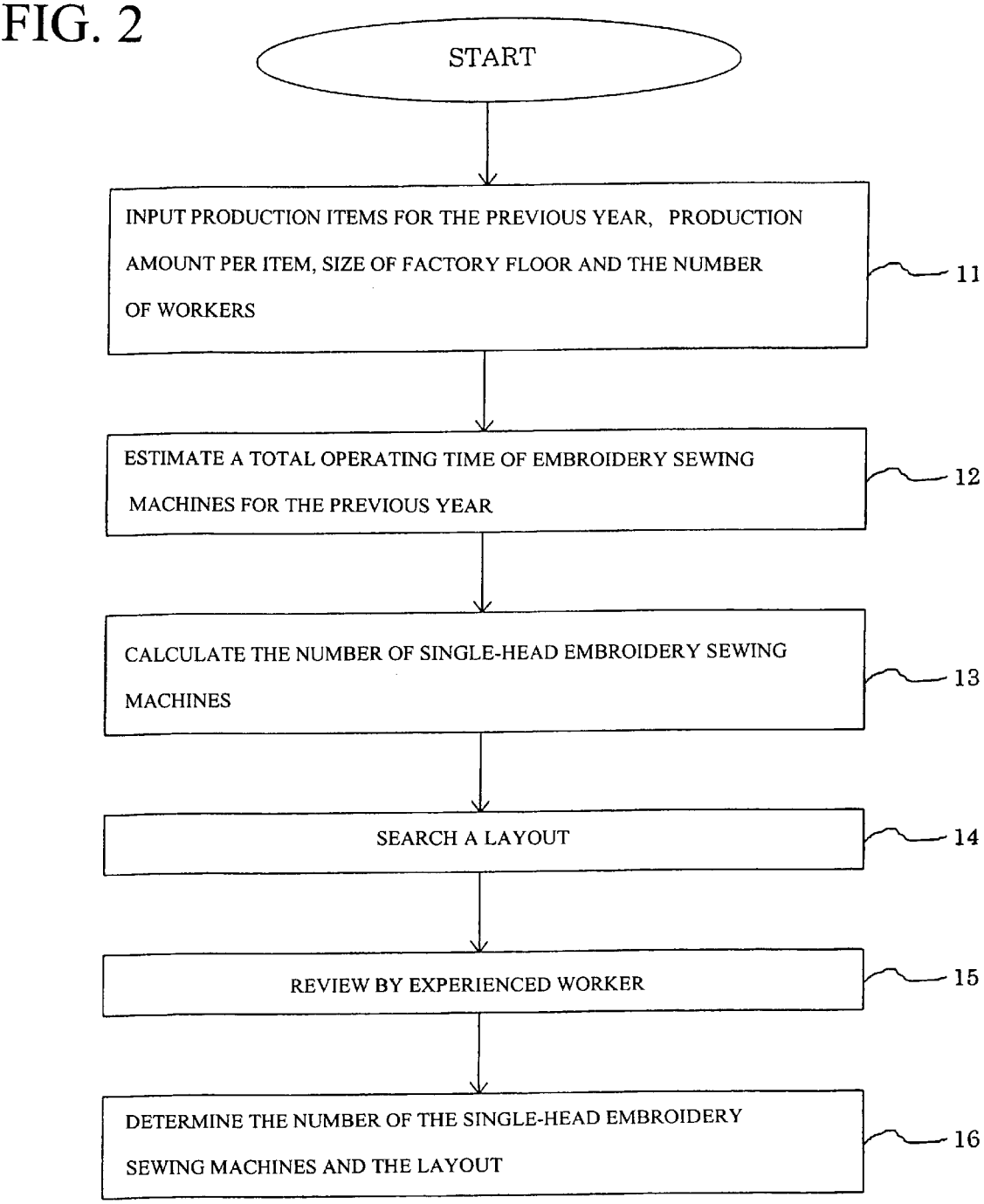
FIG. 2 shows a flow chart of the number and the layout determining program.

Referring now to FIG. 2, in step 11 of the number and the layout determining program 10, the production items for the previous year, the production volume per annum per item, the size of the factory floor and the number of workers of the embroidery supplier are inputted. The production items are classified according to the complexity of embroidery. Letter A is inputted for simplified embroider, letter B is inputted for moderate complexity embroider and letter C is inputted for complicated embroider to the program 10. The data inputted in the step 11 is arranged in a list in FIG. 3. An embroidery time t1 and a set up changing time t2 are read out and inputted to the program 10 from a data "embroidery required time per item" shown in FIG. 4 and memorized in the computer memory. The embroidery time t1 is the time while the single-head embroidery sewing machines are actually doing the embroidery work. The set up changing time t2 is the time to change the attachments of the single-head embroidery sewing machines when the production items fed into the single-head embroidery sewing machines are changed. When a baseball cap is embroidered, an embroidery frame for the baseball cap needs to be attached to the machine. The time of feeding and removing the embroidery frame for the baseball cap to and from the machine, and the time of changing the upper bobbin when the color of the embroidery thread of the fed item is a special one, correspond to the set up changing time t2. When identical items are fed into the identical single-head embroidery sewing machines, the time t3 for inserting or pulling the embroidery frame, attached to the article of the item, to the machine is needed, but the frame changing time t3 is a constant time independent of the production items.

In step 12, the total operating time T of the embroidery sewing machines for the previous year is estimated. Namely, the total operating time T is estimated as follows for each item. Multiply the volume of the production of each item by the sum of the embroidery time t1 and the frame changing time t3. Add two times the set up changing time (t2×2) of the starting time and the finishing time of the manufacturing of the item. Subtract the frame changing time t3 for the previous item from the above estimated value. By summing up the values of all items, the total operating time T is estimated. In a step 13, the necessary number S of the single-head embroidery sewing machines is calculated as follows. Divide the total operating time T by the value of the annual factory operating time Y corresponding to the operating time of one single-head embroidery sewing machine multiplied by the operating ratio $\epsilon$. By rounding up the quotient below decimal places, the necessary number S of the single-head embroidery sewing machines is calculated.

In the memory 7 of the computer 6, various layouts in proportion to the shape and the size of the factory floor are inputted according to the number of the single-head embroideries. The most appropriate layout to the floor size inputted in the step 11 with the number of the single-head embroideries calculated by the step 13 is searched and outputted in step 14. In step 15, the number and the layout of the single-head embroideries calculated in the steps 13, 14 are recalculated and reviewed by an experienced worker based on can the pattern of the production items, the volume of the lot and the number of the workers inputted in the step 11. In step 16, the number and the layout of the single-head embroidery sewing machines of the embroidery production system with single-head embroidery sewing machines suitable for the operation condition of the embroidery supplier is determined.

Figure 5:
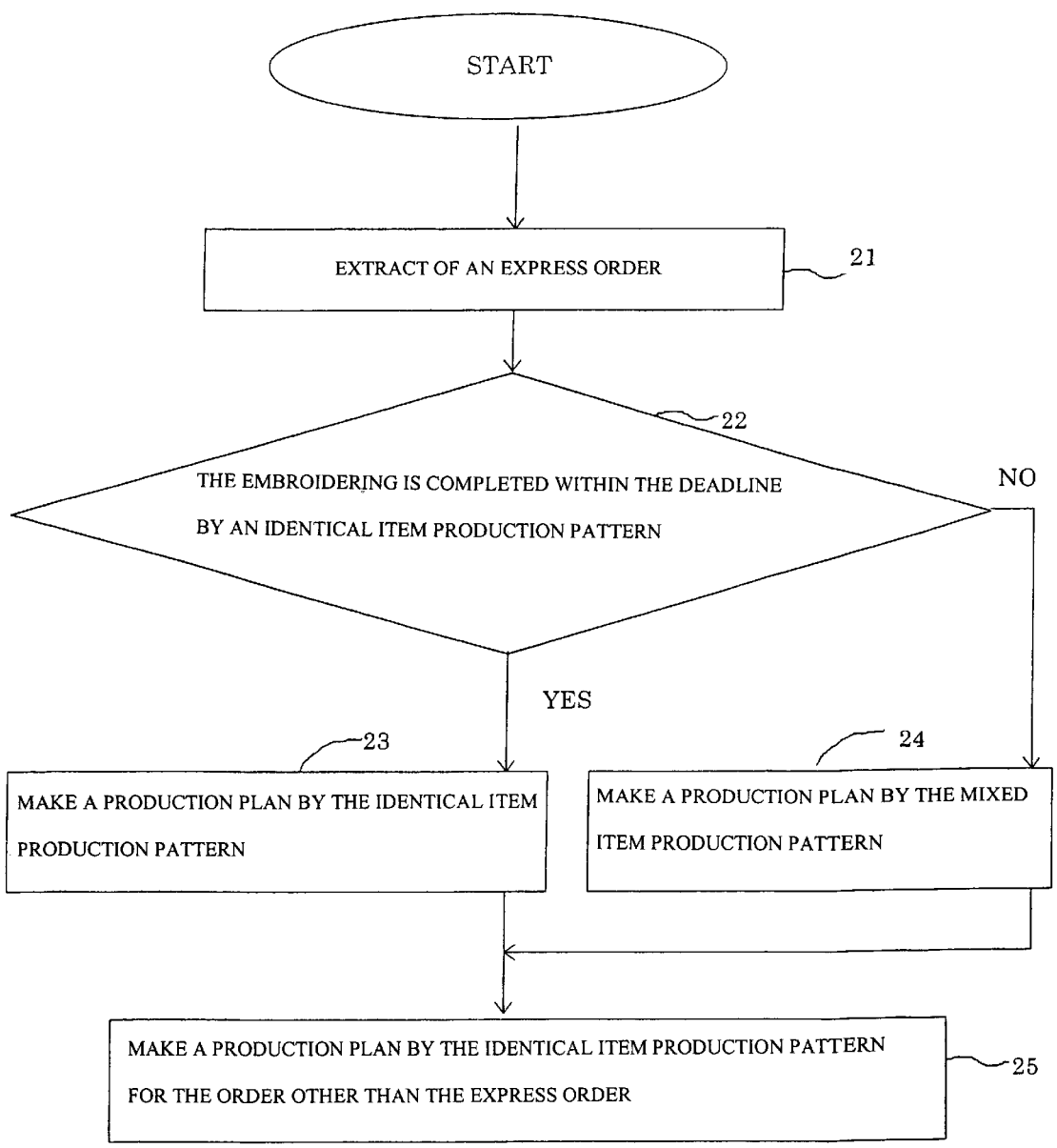
FIG. 5 shows a flow chart of a production planning program.

The production planning program 20 in FIG. 5, making a production plan to operate the single-head embroidery sewing machines 2, allocates the items and the volume of production, which should be embroidered within the day, to each single-head embroidery sewing machine 2, per day, in order to complete the embroidering by the due time and date. The production planning program 20 is based on an order list shown in FIG. 6, inputting the order volume, the item, the volume, the volume of stitch, the volume of color, the classification, the customer and the due date according to each order. There are two patterns of inserting of the items to be embroidered to each plurality of single-head embroidery sewing machines 2. One is an identical item production pattern, used when inserting identical items to the plurality of single-head embroidery sewing machines 2 respectively. The other is mixed production pattern, used when mixing articles of different items to each single-head embroidery sewing machine 2. The identical item production pattern can produce higher productivity since the sum of the set up changing times is small. Accordingly, the production time for a working allocation to each single-head embroidery sewing machine 2 per day is mainly made based on the identical item production pattern.

However, in the mixed production pattern in which the certain items are embroidered by a plurality of the single-head embroidery sewing machines simultaneously, the required time to complete the embroidery of the production volume of a given order is shortened. In case an express order occurs, such that the production cannot be completed by the predetermined date using the identical item production pattern, the embroidery supplier may miss the deadline unless the production plan is made by the mixed production pattern. The production planning program 20 therefore selects the more profitable pattern between the identical item production pattern and the mixed production pattern based on the item, the production volume and the due date of the articles which should be embroidered within the predetermined deadline. The production plan for operating each single-head embroidery sewing machine is made by the profitable pattern.

First, in step 21, the express order is extracted. Next, in step 22 it is judged whether the embroidering is completed within the deadline if the embroidering of the express order is made by the identical item production pattern. In step 23, the production plan for producing the articles of the express order by the identical item production pattern is made if it can be completed by the deadline. In step 24, the production plan for producing the articles of the express order by the mixed production pattern is made if it cannot be completed by the deadline. Then in step 25, the production plan reverts to doing the embroidery by the identical item production pattern after the express order is completed.

In the embroidery production system by three single-head embroidery sewing machines 1, the production plan of the order list is shown in FIG. 6. For instance, an order of sets of a baseball cap, a T-shirt and a towel for customer A is extracted as an express order. The completion deadline is set to 10 o'clock, taking the transportation time into account since the due date is at 12 o'clock in Jun. 1, 2000. If the production plan is made by the identical item production pattern for the express order, it takes approximately two and a half hours for embroidering the forty baseball caps as shown in FIG. 7. This builds in room for about thirty minutes delay in the production. Whereas, if the production plan is made by the mixed production pattern for the express order, it takes approximately one hour and forty five minutes for completing the embroidering of all items as shown in FIG. 8. If the embroidering of the express order starts at 8 o'clock in the morning, the items can be completed by ten o'clock, which is the completion deadline. Accordingly, the production plan of the embroidering for the express order for customer A by the mixed production pattern from 8 o'clock in the morning is chosen. As for the order whose completion deadline is at 17 o'clock of the closing time in Jun. 1, 2000 shown in FIG. 6, the production plan for embroidering by the identical item production pattern is made following after the express order.

Figure 9:
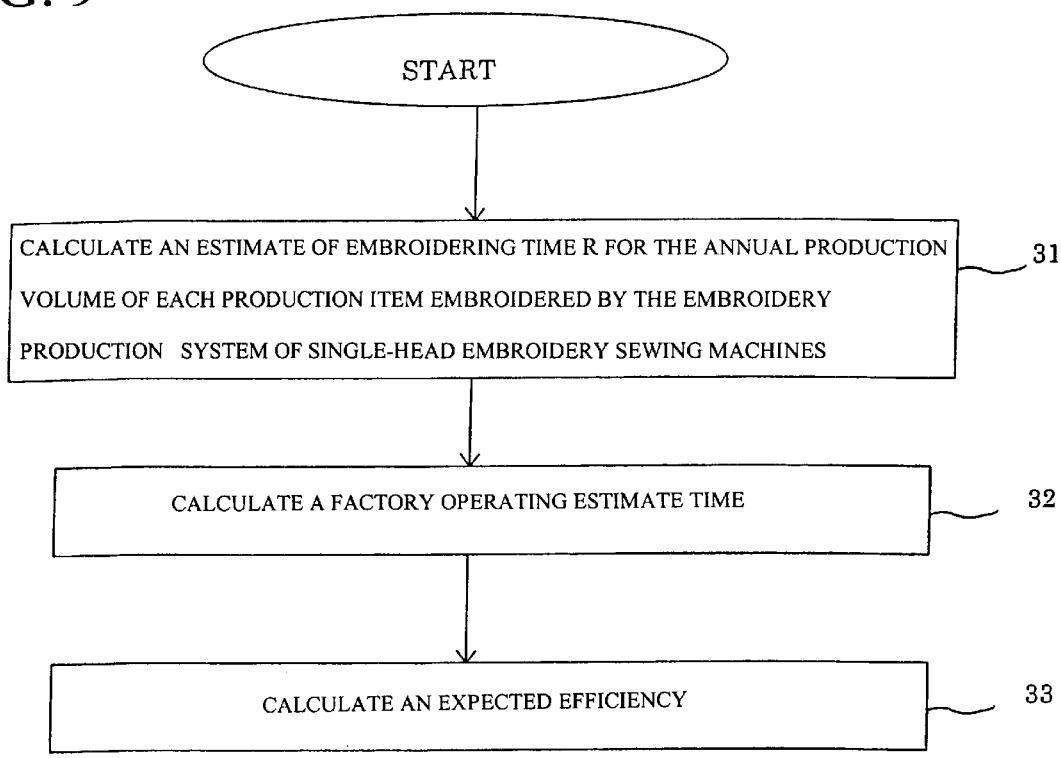
FIG. 9 shows a flow chart of an expected efficiency calculating program.

FIG. 9 is a flow chart showing an expected efficiency calculating program of the operation of each single-head embroidery sewing machine. The program uses the embroidery production system with single-head embroidery sewing machines determined by the number and the layout determining program 10 according to the production plan made by the production planning program 20. In step 31, an estimated embroidery time R for the annual production volume of each production item is calculated. In the calculation at step 31, the data inputted in the step 11 is appropriated. In a step 32, a factory operating estimated time P is calculated by dividing the estimated embroidery time R by the operating ratio ε. The expected efficiency E is calculated as follows. Subtract the calculated factory operating estimated time P from a factory operating time Y, and multiply the difference by an operating cost h per hour in a factory (step 33).

It is anticipated that the expected efficiency E will be improved by several percentage points by use of the production plan as compared to operating each single-head embroidery sewing machine without the production plan—at a considerable savings to the embroidery supplier. In exchange for permission to install the number and layout determining program 10 or the production planning program 20 in the memory 7 of its computer 6, the embroidery supplier can pay the provider of the embroidery production system through the Internet for instance. After confirming the payment, the embroidery supplier can send the programs 10 and 20 to the computer 6 through the Internet.

In the above explained embodiment, the embroidery supplier and the provider of the embroidery production system together determine the number and the layout of the single-head embroidery sewing machines 2 of the embroidery production system with single-head embroidery sewing machines 1 by the number and the layout determining program 10 based on the production items, the production volume per item, and the size of the factory floor of the embroidery supplier.

The expected efficiency of the operation of each single-head embroidery sewing machine 2 is calculated by the expected efficiency calculating program using the embroidery production system with single-head embroidery sewing machines 1 determined by the number and the layout determining program 10 according to the production plan made by the production planning program 20. To improve the expected efficiency, by several percentage points for instance, the embroidery supplier will pay to have the number and the layout determining program 10 and the production planning program 20 installed in the computer of the embroidery supplier.

The embroidery supplier inputs the order volume, the items, the volume, the volume of stitch, the volume of color, the customer and the due date in the order list inputted in the memory 7 of the computer 6 according to each order. The CPU of the computer 6 carries out the production planning program 20. The CPU allocates the items and the volume which should be embroidered per day, to each single-head embroidery sewing machine 2, referring to the items, the volume, the volume of stitch, the volume of color, the customer and the due date in the order list according to each order so as to complete the order by the due date. The completion deadline of each order is determined by subtracting the transportation time to the customer from the due date. The completion deadline is automatically recorded in the order list.

If the order changes, the embroidery supplier should change the volume and the layout of the single-head embroidery sewing machines 2 by the number and the layout determining program 10. If necessary, the embroidery supplier should purchase the single-head embroidery sewing machines and arrange them according to the layout made by the program 10.

Having now fully described the invention, it will be apparent to one of the ordinary skill in the art that many changes and modifications can be made without departing from the spirit of the invention as set forth herein.

What is claimed is:

1. A method for using an embroidery production system in a factory having a plurality of single-head embroidery sewing machines, comprising the steps of:

determining the number and layout of single-head embroidery sewing machines to be used in producing an item based on the type of item to be embroidered, the production volume for the item, and the size of the factory floor; and making a production plan for operating each single-head embroidery sewing machine based on the type of item, the production volume for the item, and a due date for completion of production.

2. A method for using an embroidery production system in a factory having a plurality of single-head embroidery sewing machines, comprising the steps of:

determining the number and layout of single-head embroidery sewing machines to be used in producing an item based on the type of item, the production volume for the item, the size of the factory floor;

determining the more profitable production pattern between a pattern of operating each single-head embroidery sewing machine by repeatedly embroidering a single type of item and a pattern of operating each single-head embroidery sewing machine by embroidering different types of items, said step of determining the more profitable production pattern taking into account a necessary production volume for said single type of item and a due date for completion of said necessary production volume;

making a production plan for operating each single-head embroidery sewing machine based on the determined more profitable pattern.

3. The method as defined in claim 1, further comprising the steps of:

calculating an expected improved efficiency of operating each single-head embroidery sewing machine according to the production plan as compared to operating each single-head embroidery sewing machine without the production plan; and installing a single-head embroidery sewing machine number and layout determining device and a production planning device in a computer of an embroidery supplier in exchange for a payment to a provider of an embroidery production system, the payment being related to the expected improved efficiency.

4. A method for an embroidery production system having a plurality of single-head embroidery sewing machinery as defined in claim 2, further comprising the step of calculating an expected improved efficiency of operating each single-head embroidery sewing machine according to the production plan as compared to operating each single-head embroidery sewing machine without the production plan.

5. A method for an embroidery production system having a plurality of single-head embroidery sewing machines as, defined in claim 2, further comprising the step of installing a single-head embroidery sewing machine number and layout determining device and a production planning device in a computer of an embroidery supplier in exchange for a payment to a provider of an embroidery production system, the payment being related to an expected improved efficiency of operating each single-head embroidery sewing machine according to the production plan as compared to operating each single-head embroidery sewing machine without the production plan.

6. A method for an embroidery production system having a plurality of single-head embroidery sewing machines as defined in claim 4, further comprising the step of installing a single-head embroidery sewing machine number and layout determining device and a production planning device in a computer of an embroidery supplier in exchange for a payment to a provider of an embroidery production system, the payment being related to the expected improved efficiency.

7. An embroidery production system having a plurality of single-head embroidery sewing machines, comprising:

means for determining the number and layout of single-head embroidery sewing machines to be used in producing an item based on the type of item to be embroidered, the production volume for the item, the size of a factory floor; and means for making a production plan for operating each single-head embroidery sewing machine based on the type of item, the production volume for the item, and a due date for completion of production.

8. An embroidery production system having a plurality of single-head embroidery sewing machines, comprising:

means for determining the number and layout of single-head embroidery sewing machines to be used in producing an item based on the type of item, the production volume for the item, the size of a factory floor;

means for determining the more profitable production pattern between a pattern of operating each single-head embroidery sewing machine by repeatedly embroidering a single type of item and a pattern of operating each single-head embroidery sewing machine by embroidering different types of items, said step of determining the more profitable production pattern taking into account a necessary production volume for said single type of item and a due date for completion of said necessary production volume;

means for making a production plan for operating each single-head embroidery sewing machine based on the determined more profitable pattern.

9. An embroidery production system having a plurality of single-head embroidery sewing machines as defined in claim 7, further comprising:

means for calculating an expected improved efficiency of operating each single-head embroidery sewing machine according to the production plan as compared to operating each single-head embroidery sewing machine without the production plan; and means for installing a single-head embroidery sewing machine number and layout determining means and a production planning means in a computer of an embroidery supplier in exchange for a payment to a provider of an embroidery production system, the payment being related to the expected improved efficiency.

10. An embroidery production system having a plurality of single-head embroidery sewing machines as defined in claim 8, further comprising means for calculating an expected improved efficiency of operating each single-head embroidery sewing machine according to the production plan as compared to operating each single-head embroidery sewing machine without the production plan.

11. An embroidery production system having a plurality of single-head embroidery sewing machines as defined in claim 8, further comprising means for installing a single-head embroidery sewing machine number and layout determining means and a production planning means in a computer of an embroidery supplier in exchange for a payment to a provider of an embroidery production system, the payment being related to an expected improved efficiency of operating each single-head embroidery sewing machine according to the production plan as compared to operating each single-head embroidery sewing machine without the production plan.

12. An embroidery production system having a plurality of single-head embroidery sewing machines as defined in claim 10, further comprising installing a single-head embroidery sewing machine number and layout determining means and a production planning means in a computer of an embroidery supplier in exchange for a payment to a provider of an embroidery production system, the payment being related to the expected improved efficiency.

13. An embroidery production system having a plurality of single-head embroidery sewing machines according to claim 7, wherein said means for determining the number and the layout of single-head embroidery sewing machines determines the layout of the plurality of single-head embroidery sewing machines, a plurality of worktables for reading or removing the articles to be embroidered to or from embroidery frames, a working passage between the sewing machines and the worktables, and a cabinet behind the worktables for storing maintenance tools.

14. A method for using an embroidery production system in a factory having a plurality of single-head embroidery sewing machines, comprising the steps of:

using a number and layout determining device to determine the number and layout of single-head embroidery sewing machines to be used in producing an item based on the type of item to be embroidered, the production volume for the item, the size of the factory floor; and using a production planning device to make a production plan for operating each single-head embroidery sewing machine based on the type of item, the production volume for the item, and a due date for completion of production.

15. A method for using an embroidery production system in a factory having a plurality of single-head embroidery sewing machines, comprising the steps of:

using a number and layout determining device to determine the number and layout of single-head embroidery sewing machines to be used in producing an item based on the type of item, the production volume for the item, the size of the factory floor;

determining the more profitable production pattern between a pattern of operating each single-head embroidery sewing machine by repeatedly embroidering an single type of item and a pattern of operating each single-head embroidery sewing machine by embroidering different types of items, said step of determining the more profitable production pattern taking into account a necessary production volume for said single type of item and a due date for completion of said necessary production volume;

using a production planning device to make a production plan for operating each single-head embroidery sewing machine based on the determined more profitable pattern.

* * * * *